INVENTOR
L. C. J. ROSCOE
BY E J Olinder
ATTORNEY

INVENTOR
L. C. J. ROSCOE
BY E. J. Oluder
ATTORNEY

INVENTOR
L. C. J. ROSCOE
BY E. J. Olinder
ATTORNEY

United States Patent Office
3,067,343
Patented Dec. 4, 1962

3,067,343

SEQUENTIAL PULSE GENERATOR EMPLOYING TWO SEQUENTIALLY ACTUATED MONOSTABLE MULTIVIBRATORS

Lawrence C. J. Roscoe, Roselle, N.J., assignor to Bell Telephone Laboratories, Incorporated, New York, N.Y., a corporation of New York Filed Oct. 11, 1960, Ser. No. 61,939
14 Claims. (Cl. 307—88.5)

This invention relates to pulse generating circuits and its principal object is to facilitate the generation of various forms and combinations of sequential pulses.

The increasingly widespread use of pulse generating circuits in a number of fields, which include radar, television, digital computing and pulse communication, for example, has created a correspondingly increased demand for maximum reliability in the operation of such circuits as well as a demand for circuits of greater flexibility and reduced complexity.

Although the generation of trains of pulses of selected uniform characteristics may generally be accomplished by a single conventional circuit such as a monostable multivibrator, for example, the production of particular combinations of pulses conforming to more complex requirements presents problems more difficult of solution. One such pulse combination is commonly termed "sequential," denoting a train of two or more pulses of equal or unequal duration in which the leading edge of each pulse is coincident in time with the trailing edge of the preceding pulse. Sequential pulses, often in combination with additional pulses, are employed to meet complex gating requirements in special purpose digital computers and in other applications where there is a need for accurately timed reference voltages or for specific time delay combinations.

One particular form of a sequential pulse combination, useful in pulse transmission systems, comprises substantially sinusoidal sequential pulse pairs wherein the pulses of each pair are opposite in polarity. Such pulses, termed "dipulses" are conventionally identified as "positive" or "negative" in accordance with the polarity of the first or leading pulse of each pair. Known circuit combinations which may be employed to generate sequential pulses, including dipulses, are unduly complex and consequently fall short of desired goals of low cost and reliability.

Accordingly, a specific object of the invention is to reduce the complexity of sequential-pulse generating circuitry.

A further object is to facilitate the generation of dipulses of either polarity without resort to complex circuitry.

These and other objects are attained in accordance with the principles of the invention by a uniquely interconnected pair of two-transistor multivibrators each comprising a respective input and a respective first output transistor. In effect, each of the two multivibrators is in turn in circuit combination with a respective second output transistor. In each of these two circuits, however, each of the two output transistors serves a dual function as the first output device of one circuit and as the second output device of the other. Consequently, a complete circuit combination in one basic form of the invention includes only four active circuit elements, although from a functional standpoint the operating capabilities of two additional active elements are turned to account.

In accordance with one aspect of the invention the basic circuit combination may be employed to generate, selectively, either of two possible sequential pulse pairs. The application of a trigger pulse to the first input transistor results in an output pulse at one output transistor followed immiediately by a second output pulse at the second output transistor. Alternatively, a trigger pulse applied to the second input transistor initiates the generation of a second sequential pulse pair with the time-order of outputs reversed.

In accordance with another aspect of the invention a respective one of the electrodes of each of the input transistors may be employed as additional output points. A respective third output pulse may then be derived from each of these third output points, opposite in polarity to the sequential pulse pairs but coincident in duration to the total duration of a respective one of the pulse pairs. Further, the relative duration of the individual pulses comprising the sequential pulse pairs is fully flexible in that the circuit may be readily designed, in accordance with the principles of the invention, to produce a sequence of pulses of either equal or unequal duration.

A circuit embodying the principles of the invention may readily be adapted to serve any one of a wide variety of applications which require particular combinations of accurately timed sequential voltages. In one illustrative embodiment, for example, a sequential-pulse generator in accordance with the invention is employed in combination with a dipulse converter. A first or "normal" order sequential pulse pair applied to the converter produces a positive dipulse while a reverse order sequential pulse pair results in the generation of a negative dipulse.

One feature of the invention, therefore, is the combination of two monostable multivibrators, each comprising a respective active input element and a respective active output element, in which the output element in each circuit also functions as a second output element in the other.

Another feature of the invention is a four-transistor sequential pulse generator including a means for generating a first sequential pulse pair, each pulse occurring in order at a respective one of two output points and a means for generating a second sequential pulse pair with the order of appearance at the output points reversed with respect to the first pulse pair. Further, in accordance with this feature of the invention, the individual pulses in both pulse pairs may be selectively equal or unequal in duration.

Still another feature of the invention is a four-transistor generator of normal and reverse order sequential pulse pairs in combination with a means for converting one of the pulse pairs to a positive dipulse and for converting the other of the pulse pairs to a negative dipulse.

The principles of the invention together with additional objects and features thereof will be fully apprehended by considering the following detailed description of an illustrative embodiment together with the appended drawings in which.

Circuits capable of producing sequential pulse-pair combinations may be designed in accordance with techniques known in the prior art. An illustrative circuit of this type, shown in FIG. 2, comprises four monostable multivibrators each capable of generating an output pulse of a respective one of the durations $T_1$, $T_2$, $T_3$, and $T_4$, as indicated. Any one of a number of known monostable multivibrator types may be employed. A two-transistor circuit such as that shown on page 347 of a standard reference, Transistor Circuit Engineering, R. F. Shea, John Wiley and Sons, Inc., 1957, is illustrative. The $T_1$ and $T_3$ multivibrators are responsive to outputs from first and second trigger sources, respectively, and the $T_2$ and $T_4$ multivibrators are in turn responsive to outputs from the $T_1$ and $T_3$ multivibrators which are fed by way of the obvious conducting paths which include first and second differentiators, respectively. Each of the two output logic circuits may comprise a suitable OR gate.

Figure 1:
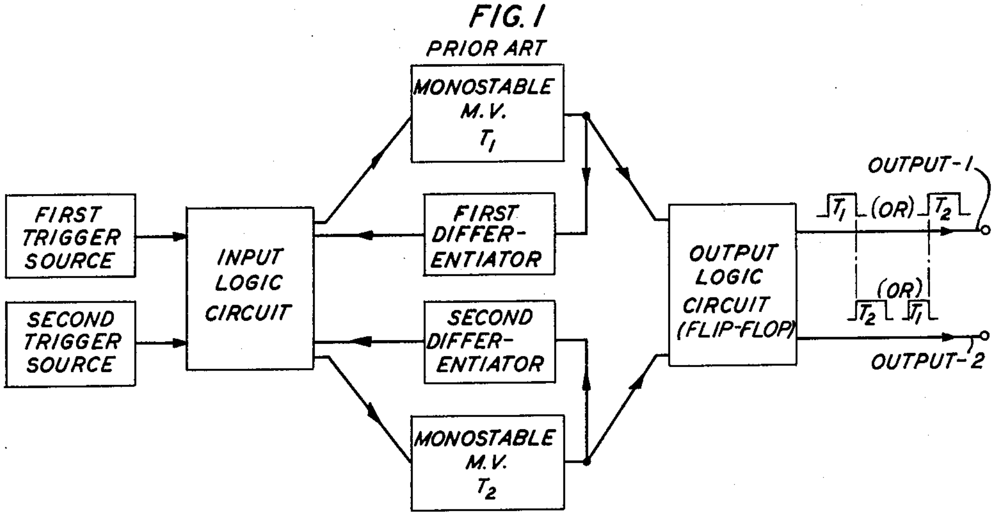
FIG. 1 is a block diagram of a first sequential pulse generator in accordance with the prior art.

The possible final pulse output combinations of the circuit of FIG. 1 are as shown. Specifically, one combination comprises the sequential pulse-pair $T_1$, $T_2$ applied to outputs 1 and 2, respectively. The generation of this combination of outputs is initiated by a pulse from the first trigger source. Alternatively, a pulse from the second trigger source results in the sequential pulse-pair $T_3$, $T_4$ applied to outputs 2 and 1, respectively. The duration of the pulses may readily be changed from the relative periods noted by appropriate changes in the timing constants of the multivibrators.

Figure 2:
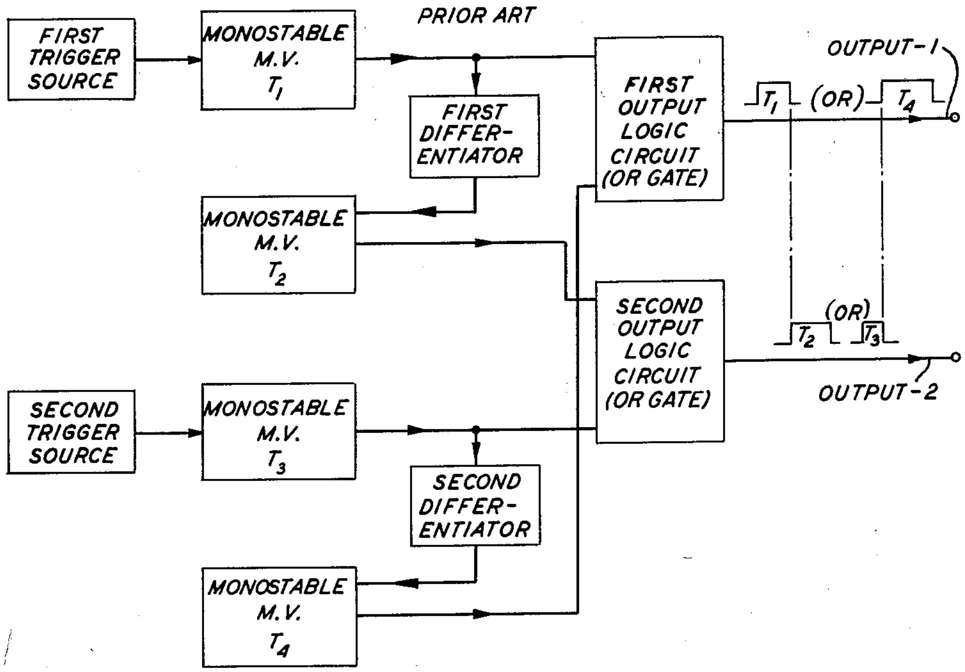
FIG. 2 is a block diagram of a second sequential pulse generator in accordance with the prior art.

It will be apparent to persons skilled in the art that some improvement in economy in circuitry may be achieved over the arrangement shown by FIG. 2 by a sequential pulse generator such as that shown in FIG. 1. As in FIG. 2, the operation of each of two monostable multivibrators capable of generating pulses of duration $T_1$ and $T_2$, respectively, is initiated by a pulse from a respective one of first and second trigger sources. In the circuit of FIG. 1, however, the output of each multivibrator is employed to initiate the generation of a pulse from the other by feeding each output through a respective one of first and second differentiators. Additionally, input logic circuitry is required to preclude astable operation, to provide suitable gating for the input signals and to initiate a return to the quiescent condition after a single cycle of operation. The output logic circuit may, for example, comprise a pair of flip-flops interconnected with suitable gating devices. The outputs derived from the circuit of FIG. 1 comprise the pulse combinations shown, namely, a first sequential pulse pair comprising pulses of duration $T_1$ and $T_2$ at output 1 and at output 2, respectively, or, alternatively, pulses of duration $T_1$ and $T_2$ at output 2 and at output 1, respectively. Thus, it is apparent that the reduced number of components employed in the circuit of FIG. 1, as compared to the circuit of FIG. 2, has been achieved only at the expense of some loss in flexibility. Specifically, pulses of only two different durations may be produced while in the circuit of FIG. 2 the generation of four unique pulse durations is possible.

Figure 3:
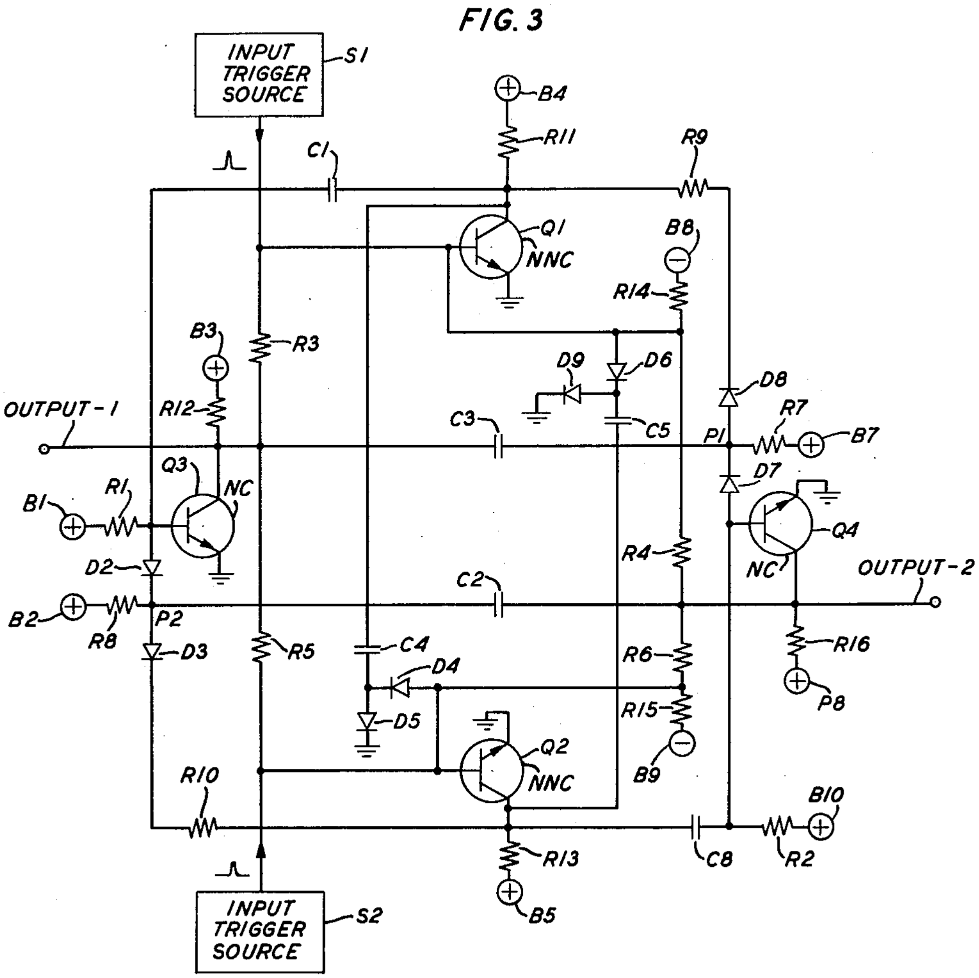
FIG. 3 is a schematic circuit diagram of a sequential pulse generator in accordance with the invention.

The circuit of FIG. 3, which is a sequential pulse generator in accordance with the principles of the invention, is capable of producing the same variety of outputs as that shown in FIG. 2 and does so with a substantial reduction in the number of circuit components required. Broadly, the circuit of FIG. 3 may be viewed as two uniquely interconnected two-transistor monostable multivibrators, the first comprising transistors Q1 and Q3, and the second comprising transistors Q2 and Q4. A first input trigger source S1 is provided to initiate the operation of the multivibrator comprising transistors Q1 and Q3 and a second input trigger source S2 is provided to initiate the operation of the multivibrator comprising transistors Q2 and Q4. Biasing potentials are supplied from the sources B1 through B10 applied by way of the associated resistors R1, R2, R7, R8, and R11 through R16, holding transistors Q1 and Q2 Off and transistors Q3 and Q4 On when the circuit is in the quiescent condition. The remainder of the circuit comprises a respective cross-connection and related circuit components between the base of each transistor and the collector of each of the other transistors. The connecting path from the collector of transistor Q1 to the base of transistor Q3 includes a single capacitor C1. The circuit is wholly symmetrical and each circuit component has a matching component on the opposite side of the circuit which performs a similar function. In this instance, capacitor C8 is similar to capacitor C1 in coupling the collector of transistor Q2 to the base of transistor Q4. A resistive path which includes resistor R3 connects the collector of transistor Q3 to the base of transistor Q1 and, similarly, a resistive path which includes resistor R6 connects the collector of transistor Q4 to the base of transistor Q2. The set of cross-connecting paths linking transistors Q3 and Q4 comprises a path which includes capacitor C3 and diode D7 between the collector of transistor Q3 and the base of transistor Q4 and a similar path which includes capacitor C2 and diode D2 between the collector of transistor Q4 and the base of transistor Q3. Another set of similar cross-connecting paths are those linking transistors Q1 and Q2. The path from the collector of transistor Q1 to the base of transistor Q2 includes capacitor C4 and diode D4 and the path from the collector of transistor Q2 to the base of transistor Q1 includes a capacitor C5 and a diode D6. Transistors Q2 and Q3 are linked by the collector-to-base path which includes resistor R10 and diodes D3 and D2 and the by the base-to-collector path which includes resistor R5. Similarly, transistors Q1 and Q4 are linked by a path which includes resistor R9 and diodes D8 and D7 and by a path from the collector of transistor Q4 to the base of transistor Q1 which includes resistor R4.

The operation of the pulse generator of FIG. 3 may best be understood by viewing it as two substantially independent circuits, each comprising three transistors and their associated circuit components. From this viewpoint one circuit comprises transistor Q1, an input transistor, transistor Q3, a first output transistor, and transistor Q4, a second or final output transistor. The second of the two circuits comprises transistor Q2, an input transistor, transistor Q4, a first output transistor, and transistor Q3, a second or final output transistor. Alternatively, the arrangement may be considered as two monostable multivibrator circuits, each employing a second output transistor, which, in each case, also serves as the first output transistor of the other circuit.

Figure 6:
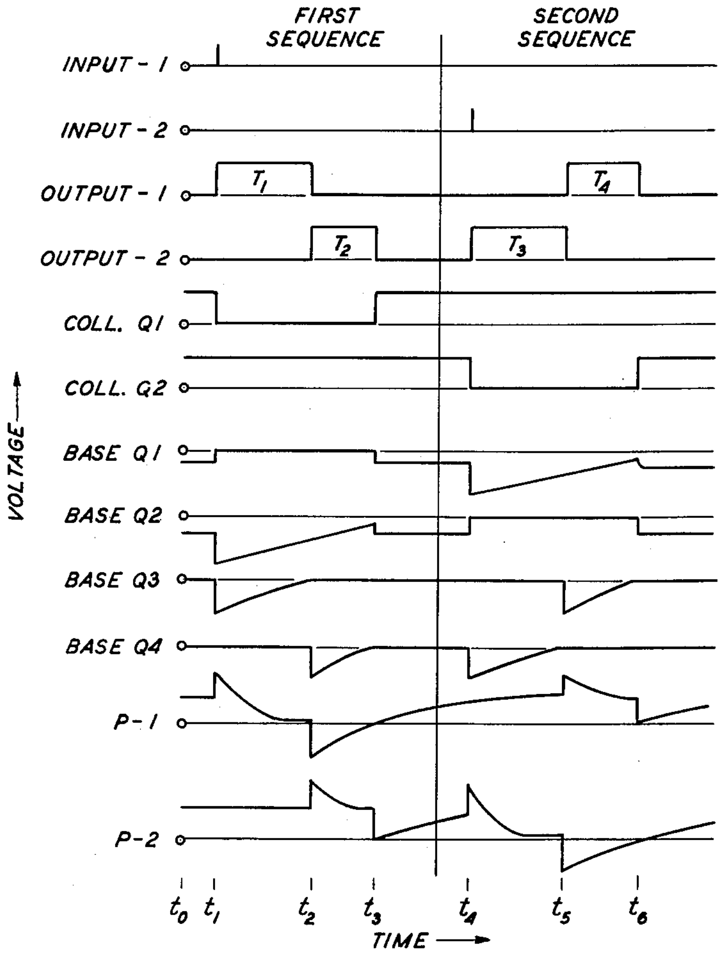
FIG. 6 is a set of waveforms illustrative of the operation of the circuit shown in FIG. 3.

An understanding of the sequence of operations involved in the generation of a typical sequential pulse pair will be aided by reference to FIG. 6 which presents a plot of significant waveforms. The application of a trigger pulse from input source S1 to the base of transistor Q1 at time $t_1$ overcomes the reverse base-emitter bias, turning transistor Q1 On. The accompanying drop on the collector of transistor Q1 is coupled to the base of transistor Q3 by way of capacitor C1 and the base of transistor Q3 is driven sufficiently negative to turn it Off. Capacitor C1 which is charged by the voltage change across it immediately starts to discharge as shown by the base Q3 waveform of FIG. 6. At the same time, the change in voltage on the collector of transistor Q3, which results from transistor Q3 turning Off, is applied to the base of transistor Q1 by way of resistor R3 which serves to hold transistor Q1 On. A further action occurring at this time is the charging of capacitor C3 by way of a path which includes point P1, diode D8, resistor R9 and the conducting collector-to-emitter path of transistor Q1. The voltage change across capacitor C3 is prevented from reaching the base of transistor Q4 by the blocking action of diode D7. As capacitor C3 continues to charge, point P1, at the junction of diodes D7 and D8 approaches ground potential. At the same time capacitor C1 is substantially discharged and transistor Q3 starts to turn Off. The accompanying negative-going collector voltage of transistor Q3 is coupled through capacitor C3 to the base of transistor Q4 and, accordingly, transistor Q4 starts to turn Off. During this phase of the operation, diode D8 blocks and diode D7 conducts. The turning Off and the turning On of transistor Q3 marks the inception and termination, respectively, of a pulse of duration $T_1$ ($t_1$—$t_2$) on the collector of transistor Q3, identified as output 1. As described, the turning On of transistor Q3 results in turning Off transistor Q4 and the accompanying rise in potential on the collector of transistor Q4 marks the inception of the second output pulse $T_2$ which extends from time $t_2$ to time $t_3$. The change in potential on the collector of transistor Q4 is precluded from reaching the base of transistor Q3 by the blocking action of diode D2, thus preventing astable operation.

It should be observed at this point that transistor Q2 remains in the Off condition throughout the cycle of operations described above, despite the direct coupling between the collector of transistor Q3 and the base of transistor Q2. A feature of the invention is that transistor Q2 is positively held in the Off condition by the drop in the collector voltage of transistor Q1, which occurs when transistor Q1 turns On, and which is applied to the base of transistor Q2 by way of capacitor C4 and diode D4. Transistor Q2 remains non-conducting, therefore, irrespective of stray or unwanted pulses which may be applied to its base.

As noted above, the second timing period ($t_2$—$t_3$) is started as capacitor C3 discharges. When capacitor C3 has completely discharged, transistor Q4 starts to turn On again. Point P2 is at supply potential placing a reverse bias on diode D2 and consequently the negative-going collector voltage on transistor Q4 does not reach the base of transistor Q3. As transistor Q4 turns On at time $t_3$ the drop in voltage on its collector is applied to the base of transistor Q1 by the path which includes resistor R4, turning transistor Q1 Off, which marks the termination of the second output pulse $T_2$. The turning Off of transistor Q1 which is the final step in returning the circuit to the quiescent condition does not result in turning transistor Q2 On, despite the collector-to-base coupling, because of the isolation provided by diodes D4 and D5. Specifically, a low impedance path is provided from the collector of transistor Q1 to ground through capacitor C4 and diode D5.

A second sequence of operations is initiated at time $t_4$ by a trigger pulse from the source S2. This sequence is substantially identical to that described above although in this instance transistor Q1 remains Off throughout and the order of output pulses at the output points is reversed. Briefly, the input pulse turns transistor Q2 On. The drop in collector voltage is applied to transistor Q4 by way of capacitor C8, turning transistor Q4 Off and marking the inception of a pulse $T_3$ at output 2. Capacitor C2 charges until time $t_5$ at which point transistor Q4 turns Off and transistor Q3 turns On, marking the termination of pulse $T_3$ at output 2 and the inception of pulse $T_4$ at output 1. The duration of pulse $T_4$ is determined primarily by the charging characteristics of capacitor C2 while the duration of pulse $T_3$ is determined by the characteristics of capacitor C8. At time $t_6$ transistor Q3 turns On again, marking the termination of the pulse $T_4$ at output 1 and transistor Q2 turns Off at which point the circuit is again in the quiescent condition.

In the second pulse sequence described above, the function and operation of individual circuit components has been largely omitted inasmuch as these functions are substantially identical to those performed by corresponding elements in the first pulse sequence. Specifically, the function of capacitor C5 and diodes D6 and D9 correspond to those performed by capacitor C4 and diodes D4 and D5. Similarly, the functions of the diode pair D2 and D3 and the diode pair D7 and D8 are simply reversed in the second pulse sequence as compared to the functions described in the first pulse sequence.

The circuit of FIG. 3 provides a still wider variety of outputs than already indicated. Specifically, the collector of transistor Q1 may be regarded as a third output point. During the first sequence a negative pulse having a duration $t_1$—$t_3$ appears at the third output point. Similarly, during the second sequence, a negative pulse having a duration $t_4$—$t_6$ appears on the collector of transistor Q2, which may be regarded as a fourth output point. The availability of these additional pulses is indicative of the wide range of multiple-gating type applications which may be performed by a circuit designed in accordance with the features of the invention.

Although the circuit of FIG. 3 employs NPN transistors it will be apparent to persons skilled in the art that, alternatively, PNP transistors may be substituted therefor, provided that the biasing arrangements are suitably modified.

Figure 4:
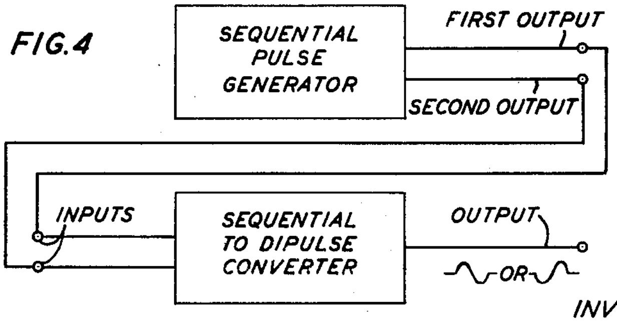
FIG. 4 is a block diagram of a dipulse generator in accordance with the invention.

FIG. 4 is a block diagram of another form of the invention which employs a sequential pulse generator of the type shown in FIG. 3 in combination with a sequential-to-dipulse converter. Each of the outputs of the sequential pulse generator is applied as a respective input to the converter. Depending on the order of inputs, the converter output comprises a dipulse of either positive or negative polarity. In this instance the timing capacitors of the sequential pulse generator are selected to provide output pulses of a common duration to ensure the generation of symmetrical dipulses.

Figure 5:
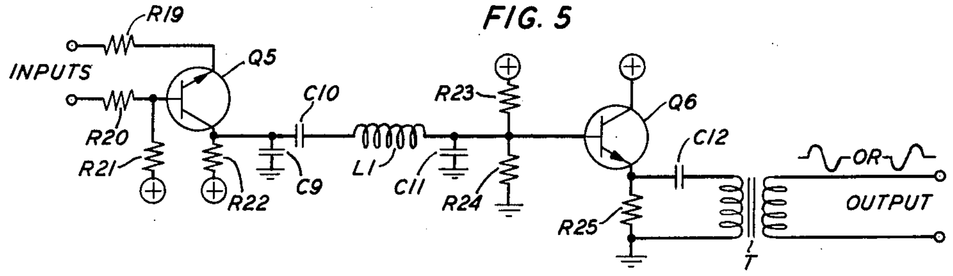
FIG. 5 is a schematic circuit diagram of a part of the circuit shown in FIG. 4.

A schematic circuit diagram of the sequential-to-dipulse converter of FIG. 4 is shown in FIG. 5. Broadly the circuit comprises a difference amplifier which includes transistor Q5 and associated circuit components, a low-pass filter comprising capacitors C9 and C11 and inductor L1 and an output stage comprising transistor Q6 and output transformer T which is coupled to an appropriate load.

When in the quiescent condition, transistor Q5 is held On, approximately in the center of its operating range, by a biasing potential applied by way of resistor R21. Application of a positive pulse to the emitter of transistor Q5 by way of resistor R19 causes transistor Q5 to cut Off and the collector potential across resistor R22 rises to the supply value. Application of the second pulse of the sequential input pair through resistor R20 to the base of transistor Q5 results in saturation and the collector potential drops to ground. Consequently, application of each of the two timing functions to the base and emitter, respectively, of transistor Q5 results in an essentially square wave on the collector.

Filtering out the high frequency components of the square wave results in the application of a substantially sinusoidal output on the base of transistor Q6. Capacitor C10 provides D.-C. blocking between transistors Q5 and Q6 and the combination of resistors R23 and R24 provides damping for the low-pass filter in order to eliminate overshoot at the base of the waveform. Additionally, resistors R23 and R24 apply biasing potential to the base of transistor Q6.

Transistor Q6 is essentially a conventional emitter-follower stage which provides a low-impedance output with some current gain to the load. Resistor R25 establishes the D.-C. operating point of transistor Q6 and capacitor C12 isolates the bias circuit from the primary of the transformer T. As indicated, the two types of polarities of dipole output pulses are obtained by reversing the order of inputs to the emitter and base of transistor Q5. This order may in turn be controlled readily by applying the proper order of trigger pulses to the sequential pulse generator.

It is to be understood that the circuits described herein are illustrative of the principles of the invention. Numerous other arrangements may be devised by persons skilled in the art without departing from the spirit and scope of the invention.

What is claimed is:

1. A sequential pulse generator comprising, in combination, a first monostable multivibrator including a first input transistor, a first output transistor and a first output point, a second monostable multivibrator including a second input transistor, a second output transistor and a second output point, each of said transistors including a respective base, emitter, and collector electrode, means including a respective one of two timing circuits connecting the base of each of said output transistors to the collector of the other of said output transistors, means for applying a first trigger pulse to said first input transistor thereby to initiate the generation of first and second sequential output pulses at said first and second output points, respectively, and means for applying a second trigger pulse to said second input transistor thereby to initiate the generation of second and third sequential output pulses at said second and first output points, respectively.

2. Apparatus in accordance with claim 1, in combination with circuit means, including a pair of input points and a third output point, responsive to the application of each of a pair of sequential pulses to a respective one of said input points, for applying a dipulse to said output point, the polarity of said dipulse being dependent on the order of application of said sequential pulses to said input points, and means connecting said first and second output points to said first and second input points, respectively.

3. Apparatus in accordance with claim 1 including means operative in the absence of said trigger signals for biasing each of said input transistors to the Off condition and each of said output transistors to the On condition.

4. Apparatus in accordance with claim 3 including means responsive to the turning On of either of said input transistors for holding the other of said input transistors Off during the generation of said sequential pulses.

5. A sequential pulse generator comprising, in combination, first and second input transistors, first and second output transistors, each of said transistors including a respective base, emitter, and collector electrode, means biasing each of said input transistors to the non-conducting condition of operation and each of said output transistors to the conducting condition of operation, means connecting the base of each of said transistors to the collector of each of the other of said transistors, said last named means comprising a first set of conducting paths, each including only a capacitive circuit element and an asymmetrically conducting impedance device, connecting the base of each of said input transistors to the collector of the other of said input transistors and connecting the base of each of said output transistors to the collector of the other of said output transistors, a second set of conducting paths, each including only resistive circuit elements, connecting the base of each of said input transistors to the base of the other and connecting the base of each of said input transistors to the collector of a respective one of said output transistors, a third set of conducting paths, each including only a pair of similarly-poled, asymmetrically-conducting impedance devices and a resistive circuit element connecting the base of each of said output transistors to the collector of a respective one of said input transistors, a fourth set of conducting paths each including only a capacitive circuit element connecting the base of each of said output transistors to the collector of a corresponding one of said input transistors, means for applying a first trigger pulse to said first input transistor, thereby to generate a first pair of sequential pulses, each having a preassigned duration, the first of said pulses occurring at the collector of said first output transistor and the second of said pulses occurring at the collector of said second output transistor, and means for applying a second trigger pulse to said second input transistor thereby to generate a second pair of sequential pulses, each having a preassigned duration, the first and second of said second pair of pulses occurring at the collector of said second output transistor and at the collector of said first output transistor, respectively.

6. Apparatus in accordance with claim 5 in combination with means responsive to said first pair of sequential pulses for generating a dipulse of one polarity and responsive to said second pair of sequential pulses for generating a dipulse of the opposite polarity.

7. Apparatus in accordance with claim 6 wherein said dipulse generating means comprises a difference amplifier including a fifth transistor and a driver including a sixth transistor, means connecting the collector of said first output transistor to the emitter of said fifth transistor and means connecting the collector of said second output transistor to the base of said fifth transistor.

8. A sequential gate pulse generator comprising, in combination, a first, a second, a third, and a fourth transistor, a first, a second, a third, and a fourth output point, each of said transistors being of a common type, each including a respective base, emitter, and collector electrode, means biasing said first and fourth transistors to the Off condition and said second and third transistors to the On condition, means for applying a trigger pulse to said first transistor thereby to shift said first transistor to the On condition, marking thereby the inception of a pulse of duration $T_1$ at said first output point, means including said second transistor responsive to the turning On of said first transistor for applying a pulse of duration $T_2$ to said second output point, said second transistor being in the Off condition for the duration of said $T_2$ pulse, means including said third transistor responsive to the shift of said second transistor from the Off to the On condition and to the accompanying termination of said $T_2$ pulse for applying a pulse of duration $T_3$ to said third output point, said third transistor being in the Off condition for the duration of said $T_3$ pulse, means responsive to the shift of said third transistor from the Off to the On condition and the accompanying termination of said $T_3$ pulse for shifting said first transistor to the Off condition marking thereby the termination of said $T_3$ pulse, said pulses $T_1$, $T_2$, and $T_3$ being further defined by substantial coincidence in time between the inception of pulses $T_1$ and $T_2$, between the termination and the inception of pulses $T_2$ and $T_3$, respectively, and between the termination of pulses $T_1$ and $T_3$, means for applying a trigger pulse to said fourth transistor thereby to shift said fourth transistor to the On condition, marking thereby the inception of a pulse of duration $T_4$ at said fourth output point, means including said third transistor responsive to the turning On of said fourth transistor for applying a pulse of duration $T_5$ to said third output point, said third transistor being in the Off condition for the duration of said $T_5$ pulse, means including said second transistor responsive to the shift of said third transistor from the Off to the On condition and to the accompanying termination of said $T_5$ pulse for applying a pulse of duration $T_6$ to said second output point, said second transistor being in the Off condition for the duration of said $T_6$ pulse, means responsive to the shift of said second transistor from the Off to the On condition and to the accompanying termination of said $T_6$ pulse for shifting said fourth transistor to the Off condition marking thereby the termination of said $T_6$ pulse, said pulses $T_4$, $T_5$, and $T_6$ being further defined by substantial coincidence in time between the inception of pulses $T_4$ and $T_5$, between the termination and the inception of pulses $T_5$ and $T_6$, respectively, and between the termination of pulses $T_4$ and $T_6$, said pulses $T_2$, $T_3$, $T_5$, and $T_6$ having a common polarity opposite to that of said pulses $T_1$ and $T_4$.

9. A gate-pulse generator comprising, in combination, two input and two output transistors of a common type, each including a respective base, emitter, and collector electrode, means including both of said output transistors responsive to the application of a trigger pulse to the base of one of said input transistors for generating a first substantially rectangular pulse of a first preassigned duration on the collector of the first of said output transistors followed by a second substantially rectangular pulse of a second preassigned duration on the collector of the second of said output transistors, the termination of said first pulse and the inception of said second pulse being substantially coincident in time, and means including both of said output transistors responsive to the application of a trigger pulse to the base of the other of said input transistors for generating a third substantially rectangular pulse of a third preassigned duration on the collector of the second one of said output transistors followed by a fourth substantially rectangular pulse of a fourth preassigned duration on the collector of the first one of said output transistors, the termination of said third pulse and the inception of said fourth pulse being substantially coincident in time, each of said pulses having a different preassigned duration.

10. A dipulse generator comprising, in combination, first and second input transistors and first and second output transistors all of a common type, each including a base, a grounded emitter, and a collector electrode, means biasing each of said input transistors in the Off condition and each of said output transistors in the On condition, a first plurality of means each including a respective capacitive circuit element and a respective asymmetrically conducting impedance device each connecting, respectively, the base of each of said input transistors to the collector of the other of said input transistors and connecting the base of each of said output transistors to the collector of the other of said output transistors, a second plurality of means each including a respective capacitive circuit element each connecting, respectively, the base of each of said output transistors to the collector of its corresponding input transistor, means for applying a first trigger pulse to the base of said first input transistor whereby a first substantially rectangular pulse is generated on the collector of said first output transistor followed by a second substantially rectangular pulse on the collector of said second output transistor, the trailing edge of said first pulse and the leading edge of said second pulse being substantially coincident in time, means for applying a second trigger pulse to the base of said second input transistor whereby a third substantially rectangular pulse is generated on the collector of said second output transistor followed by a fourth substantially rectangular pulse on the collector of said first output transistor, the trailing edge of said third pulse and the leading edge of said fourth pulse being substantially coincident in time, and means responsive to said first and second pulses for generating a positive dipulse and to said second and third pulses for generating a negative dipulse.

11. Apparatus in accordance with claim 10 wherein said dipulse generating means comprises a difference amplifier including a fifth transistor, a low-pass filter, a driver circuit including a sixth transistor, means connecting the collector of each of said output transistors to a respective one of the electrodes of said fifth transistor, means connecting the output of said difference amplifier to the input of said low-pass filter, and means connecting the output of said low-pass filter to the input of said driver circuit.

12. A sequential pulse generator comprising, in combination, first and second input and first and second output NPN transistors each including a respective base, grounded emitter and collector electrode; a plurality of series circuit combinations each including a respective capacitive circuit element and a respective asymmetrically conducting impedance device each connecting the base of a respective one of said input transistors to the collector of the other of said input transistors, and the base of a respective one of said output transistors to the collector of the other of said output transistors; a plurality of resistive circuit elements each connecting the base of a respective one of said input transistors to the collector of a respective one of said output transistors; a plurality of series circuit combinations each including a respective pair of similarly poled asymmetrically conducting impedance devices and a respective resistive circuit element each connecting the base of a respective one of said output transistors to the collector of the non-corresponding one of said input transistors; a plurality of capacitive circuit elements each connecting the base of a respective one of said output transistors to the collector of the corresponding one of said input transistors; means biasing said input transistors in the Off condition and said output transistors in the On condition; means for applying a first trigger pulse to the base of said first input transistor, thereby to generate a first pair of substantially rectangular sequential pulses, the first on the collector of said first output transistor and the second on the collector of said second output transistor; and means for applying a second trigger pulse to the base of said second input transistor, thereby to generate a second pair of substantially rectangular sequential pulses, the first on the collector of said second output transistor and the second on the collector of said first output transistor; all of said pulses being of the same polarity and each having a duration dependent on the capacitance of a respective one of said capacitive circuit elements.

13. The combination defined in claim 12 in further combination with a difference amplifier including a pair of input points and an output point, a low-pass filter and a driver circuit each including a respective input point and a respective output point, means connecting the collector of each of said output transistors to a respective one of the input points of said difference amplifier, means for applying the output of said difference amplifier to the input of said filter and the output of said filter to the input of said driver circuit whereby, upon the generation of said first sequential pulse pair, a positive dipulse is applied to the output point of said driver circuit, and whereby, upon the generation of said second sequential pulse pair a negative dipulse is applied to the output point of said driver circuit.

14. A sequential pulse generator comprising, in combination, a first monostable multivibrator including a first input transistor and a first output transistor, a second monostable multivibrator including a second input transistor and a second output transistor, each of said transistors being of a common type, each including a respective base, a grounded emitter, and a collector electrode, means biasing each of said input transistors in the Off condition and each of said output transistors in the On condition, means including a respective one of two timing circuits connecting the base of each of said output transistors to the collector of the other, means for applying a first trigger pulse to the base of said first input transistor, thereby to initiate the generation of first and second sequential, substantially rectangular output pulses of a common polarity, said first pulse appearing on the collector of said first output transistor for a duration $T_1$ and said second pulse appearing on the collector of said second output transistor for a duration $T_2$, means for applying a second trigger pulse to the base of said second input transistor, thereby to initiate the generation of third and fourth sequential, substantially rectangular output pulses of said common polarity, said third pulse appearing on the collector of said second output transistor for a duration $T_3$ and said fourth pulse appearing on the collector of said first output transistor for a duration $T_4$.

No references cited.